United States Patent
Montalvo et al.

(10) Patent No.: US 9,519,800 B2
(45) Date of Patent: Dec. 13, 2016

(54) DEVICE AND METHOD FOR ONLINE STORAGE, TRANSMISSION DEVICE AND METHOD, AND RECEIVING DEVICE AND METHOD

(75) Inventors: Luis Montalvo, Cesson Sévigné (FR); Nicolas Le Scouarnec, Cesson Sévigné (FR); Serge Defrance, Cesson Sévigné (FR); Frederic Lefebvre, Cesson Sévigné (FR); Patrick Perez, Cesson Sévigné (FR)

(73) Assignee: Thomson Licensing (FR)

( * ) Notice: Subject to any disclaimer, the term of this patent is extended or adjusted under 35 U.S.C. 154(b) by 458 days.

(21) Appl. No.: 13/937,176

(22) PCT Filed: Dec. 16, 2011

(86) PCT No.: PCT/FR2011/053034
§ 371 (c)(1),
(2), (4) Date: Sep. 30, 2013

(87) PCT Pub. No.: WO2012/093216
PCT Pub. Date: Jul. 12, 2012

(65) Prior Publication Data
US 2014/0019765 A1    Jan. 16, 2014

(30) Foreign Application Priority Data

Jan. 7, 2011   (FR) ...................... 11 50135

(51) Int. Cl.
*H04L 9/32* (2006.01)
*G06F 21/62* (2013.01)
(Continued)

(52) U.S. Cl.
CPC ..... *G06F 21/6245* (2013.01); *G06F 17/30244* (2013.01); *G06F 21/6218* (2013.01);
(Continued)

(58) Field of Classification Search
CPC .. G06F 21/62; G06F 21/6218; G06F 21/6245; G06F 21/6254; G06F 21/6272
(Continued)

(56) References Cited

U.S. PATENT DOCUMENTS 6,084,595 A   7/2000  Bach
6,463,432 B1  10/2002 Murakawa
(Continued)

FOREIGN PATENT DOCUMENTS

CN    101820426    4/2010
JP    2009163466   7/2009
(Continued)

OTHER PUBLICATIONS

Lerone Banks et al., "All Friends are Not Created Equal: An Interaction Intensity Based Approach to Privacy in Online Social Networks", pp. 970-974, 2009 International Conference on Computational Science and Engineering, 978-0-7695-3823-5/09, 2009 IEEE,DOI 10.1109/CSE.2009.429.
(Continued)

*Primary Examiner* — Daniel Potratz
(74) *Attorney, Agent, or Firm* — Jack Schwartz & Associates, PLLC

(57) ABSTRACT

A device and a method for online storage, device and method for searching for similar content, a device and a method of transmission and a device and a method. Encrypted data is saved at a provider of online services. With the encrypted data, encrypted hashing data is saved with a public key and the content to save is encrypted with the encrypted hash. This advantageously enables data duplication at the online service provider to be prevented while preserving the private life of the users of the service. In order to search for content similar to reference multimedia data, fingerprints are also saved at the service provider. In order
(Continued)

to limit the number of false positives returned, the fingerprint can further contain a search fingerprint, an encrypted selection fingerprint.

12 Claims, 6 Drawing Sheets

(51) Int. Cl.
G06F 17/30 (2006.01)
G06F 21/64 (2013.01)

(52) U.S. Cl.
CPC .......... *G06F 21/6272* (2013.01); *G06F 21/64* (2013.01); *H04L 9/3236* (2013.01); *G06F 21/62* (2013.01); *G06F 2221/2107* (2013.01)

(58) Field of Classification Search
USPC .......................................................... 713/176
See application file for complete search history.

(56) References Cited

U.S. PATENT DOCUMENTS

| | | | |
|---|---|---|---|
| 7,844,834 B2 | 11/2010 | Leone et al. | |
| 8,041,641 B1* | 10/2011 | Panchbudhe | G06F 11/1453 705/52 |
| 8,199,911 B1 | 6/2012 | Tsaur | G06F 17/30156 380/278 |
| 8,281,143 B1* | 10/2012 | Clifford | G06F 21/6218 380/277 |
| 8,401,185 B1* | 3/2013 | Telang | H04L 67/1095 380/44 |
| 2004/0162808 A1* | 8/2004 | Margolus | G06F 17/30097 |
| 2004/0215962 A1* | 10/2004 | Douceur | H04L 9/3247 713/167 |
| 2008/0005563 A1 | 1/2008 | Rubin | |
| 2009/0290714 A1 | 11/2009 | Charles et al. | |
| 2009/0300356 A1 | 12/2009 | Crandell | |
| 2010/0070476 A1 | 3/2010 | O'Keefe et al. | |
| 2010/0100721 A1 | 4/2010 | Su et al. | |
| 2010/0114833 A1 | 5/2010 | Mu | |
| 2010/0185615 A1* | 7/2010 | Monga | G06F 17/30247 707/736 |
| 2010/0313040 A1 | 12/2010 | Lumb | |
| 2010/0318782 A1 | 12/2010 | Auradkar et al. | |
| 2012/0159175 A1* | 6/2012 | Yocom-Piatt | G06F 11/1453 713/176 |
| 2012/0204024 A1* | 8/2012 | Augenstein | G06F 11/1453 713/150 |

FOREIGN PATENT DOCUMENTS

| | | |
|---|---|---|
| WO | WO0161438 | 8/2001 |
| WO | WO03019412 | 3/2003 |

OTHER PUBLICATIONS

Kevin Beyer et al. "When Is "Neareast Neighbor" Meaningful", ICDT'99, LNCS 1540, pp. 217-235, Springer-Verlag Berlin Heidelberg,1998.

Jean-Sebastien Coron, "What is Cryptography" Crypto Corner, IEEE Computer Society, pp. 70-73, 1540-7993/06, 2006 IEEE, IEEE Security & Privacy.

Renan Coudray et al., "Global Motion Estimation for MPEG-Encoded Streams", 2004 International Conference on Image Processing (ICIP), pp. 3411-3414, 0-7803-8554-3/04 2004 IEEE.

John R. Douceur et al., "Reclaiming Space from Duplicate Files in a Serverless Distributed File System" pp. 1-13, 22nd IEEE International Conference on Distributed Computing Systems, Jul. 2-5, 2002, Vienna, Austria.

Martin A. Fischler et al., "Random Sample Consensus: A Paradigm for Model Fitting with Applications to Image Analysis and Automated Cartography", Graphics and Image Processing,pp. 381-395, vol. 24 No. 6, Jun. 1981, ACM 0001-0782/81/0600-0381.

Danny Harnik et al., "Side Channels in Cloud Services Deduplication in Cloud Storage" Cloud Computing, pp. 40-47, IEEE Computer and Reliability Services, 1540-7993/10, IEEE, Nov./Dec. 2010.

Hu et al: "The Good, the Bad and the Ugly of Consumer Cloud Storage" pp., 110-115, ACM Operating Systems Review. vol. 44, 2010.

Piotr Indyk et al. "Approximate Nearest Neighbors: Towards Removing the Curse of Dimensionality" pp. 604-613, ACM 1198-0-8971-962-9-98 Sloc Dallas, Texas, 1998.

Herve Jegou et al. "Aggregating Local Descriptors into a Compact Image Representation", pp. 3304-3311, 978-1-5244-6985-7/10, 2010 IEEE, Conference on Computer Vision and Pattern Recognition (CVPR).

Roman Kolpakov et al., "New Algorithms for Text Fingerprinting", pp. 342-353, CPM'06 Proceedings of the 17th Annual conference on Combinatorial Pattern Matching, 2006, ISBN:3-540-35455-7 978.

David G. Lowe, "Object Recognition from Local Scale-Invariant Features", pp. 1-8, International Conference on Computer Vision, Corfu, Sep. 1999.

A. Massoudi et al. "A Video Fingerprint Based on Visual Digest and Local Fingerprints" pp. 2297-2300, 1-4244-0481-9/06, 2006 IEEE, ICIP 2006.

Montalvo et al: "Systeme de stockage-en-ligne de photos avec confidentialite des donnes personnelles", Symposium sur la sécuritédes technologies de l'information et des communications (SSTiC2011), Jan. 7, 2011.

Ozer et al: "Robust Audio Hashing for Audio Identification", proceedings on content-based multimedia indexing, 2001.

Arun Ross et al., "Towards Reconstructing Fingerprints from Minutiae Points", pp. 68-80, proceedings of SPIE conference on biometric technology for human identification II, vol. 5779, Mar. 2005.

Schneier: "Cryptographie Appliquee algorithmes protocoles et codes sources en C", 2ème edition, Jan. 15, 2001, Vuibert, pp. 28-29,32-35.

Alexander Sibiryakov "High-Entropy Hamming Embedding of Local Image Descriptors Using Random Projections" MMSP '09, Oct. 5-7 2009, Rio de Janeiro, Brazil, 978-1-4244-4464-9/09, 2009 IEEE.

Sida Lin et al., "A Secure and Efficient Mutual Authentication Protocol Using Hash Function", pp. 545-548, 978-0-7695-3501-2/09, 2009 IEEE, DOI 10.1109/CMC.2009.129.

Josef Sivic et al., "Video Google" A Text Retrieval Approach to Object Matching in Videos, pp. 1-8, Proceedings of the Ninth IEEE International Conference on Computer Vision (ICCV 2003), 0-7695-/1950-4/03, 2003 IEEE.

Steiner: "Secure Group Key Agreement", PhD thesis, Universitat des Saarlandes, 2001.

Mark W. Storer et al., "Secure Data Deduplication", StorageSS'08, Oct. 31, 2008, Fairfax, Virginia, ACM 978-1-60558-299-3/08/10.

Hua Wang et al. "A Hybrid Data Compression Approach for Online Backup Service" Photonics and Optoelectronics Meetings (POEM) 2009, Optical Storage and New Store Technologies, vol. 7517, 751703, 2009 SPIE CCC code 0277-786X/09 DOI: 10.1117/12.843524.

Jianzong Wang et al., "Performance Analysis of Data Depudliction Technology for Storage", Photonics and Optoelectronics Meetings (POEM) 2009, Optical Storage and New Store Technologies, Proc. of SPIE vol. 7517 751711, 2009, SPIE CCC code 0277-786X/09, DOI 10.1117/12.847014.

Philippe Weinzaepfel et al. "Reconstructing an Image from Its Local Descriptors" Computer Vision and Pattern Recognition, Jun. 2011, Colorado Springs, United States <inria-00566718v2>.

French Search Report, Jun. 11, 2012.

\* cited by examiner

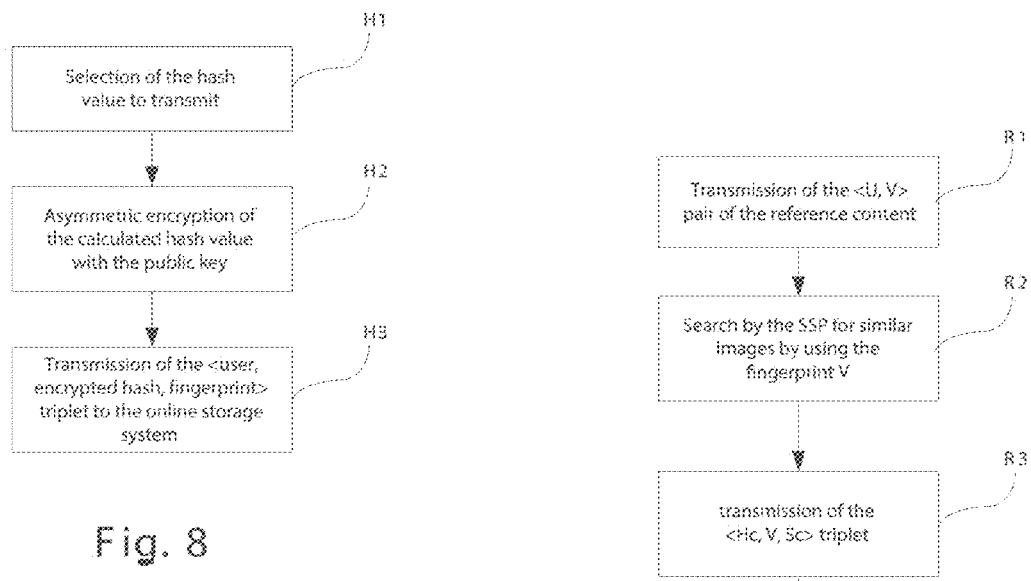
Fig. 8
Fig. 10
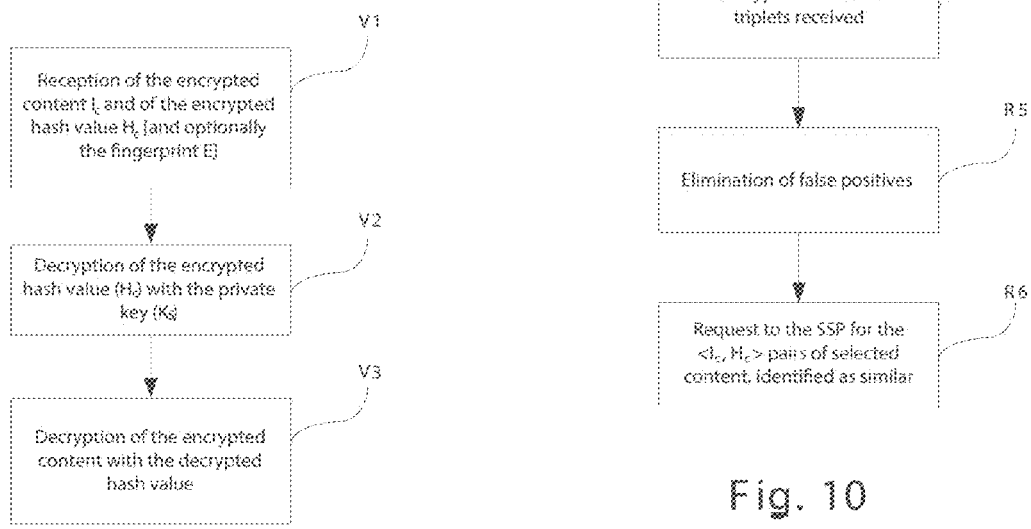
Fig. 9

DEVICE AND METHOD FOR ONLINE STORAGE, TRANSMISSION DEVICE AND METHOD, AND RECEIVING DEVICE AND METHOD

This application claims the benefit, under 35 U.S.C. §365 of International Application PCT/FR2011/053034, filed 16 Dec. 2011, which was published in accordance with PCT Article 21(2) on 12 Jul. 2012 in English and which claims the benefit of French patent application No. FR1150135, filed 20 Jan. 2011.

1. DOMAIN OF THE INVENTION

The invention relates to a device and shared storage method.

The invention further relates to a device and method for transmitting encrypted documents enabling deduplication and similar searches.

The invention finally relates to a reception device and method enabling shared documents to be decrypted and to proceed with a similar search.

In online storage systems of photos, the interests of performance of the provider of the storage service, and of protecting the private life of users of the service, can conflict. Indeed, if the users entrust their uncoded photo collections to the storage service provider, it can identify the identical images and store them in the corresponding place for a single image, and this irrespective of the owners of identical photos, however, the confidentiality of the users is compromised. However, if the users of the storage service encrypt their images before sending them to the service provider, it can no longer identify the identical images if they have been encrypted with different keys.

With the aim of optimising the storage space and file downloading times, the Storage Service Providers (SSP) can apply file deduplication techniques to the data of the users. Deduplication means the fact of not duplicating a same content.

Some SSPs apply these techniques not only to data belonging to the same user account (intra-account deduplication) but also to data belonging to different user accounts (inter-account deduplication). This way of managing the uncoded data of the users can be perceived by the users as an attack on their private life.

A counter-measure to the handling of uncoded data is the encryption of data. The users can encrypt the images before sending them to the online storage service provider. Unfortunately, a same uncoded content encrypted with two different keys, produces two very different encrypted contents. The private life of the users is preserved but the SSP cannot detect that the two encrypted messages correspond to a same uncoded message and it can no longer optimise the storage space.

2. SUMMARY OF THE INVENTION

The invention proposes to overcome at least one of the disadvantages of the prior art.

The invention relates to an online storage system that reconciles the two apparently conflicting interests. The online storage service provider has the capacity to identify not only the identical multimedia data by also the similar multimedia data, even if it is encrypted with different keys, without compromising the private life of the users.

For this purpose, the invention relates to an online storage device able to store multimedia data. The device comprises means for saving the multimedia data in encrypted form and for each item of encrypted data, an associated fingerprint. The encrypted multimedia data is encrypted by using a hash value. The hash value is obtained by hashing non-encrypted multimedia data. The fingerprint comprises an non-encrypted search vector.

Advantageously, the fingerprint comprises an encrypted verification vector.

Preferentially, the encrypted verification vector is obtained by the encryption of the verification vector with the hash value.

Advantageously, the device is able to store at least one user identifier and one encrypted hash per user, the encrypted hash being encrypted by using a public encryption key of the user.

According to a variant, the device is able to store at least one user identifier and one encrypted hash per user, the encrypted hash being encrypted by using a public encryption key of the user.

According to a particular embodiment, the device comprises means for comparing, during each save of multimedia data, the encrypted multimedia data saved with the encrypted multimedia data to save in such a manner as not to duplicate the saved multimedia data.

Advantageously, the device comprises means for:
  receiving a first request from a sending user. This request for a required target multimedia document comprises at least the fingerprint associated with the encrypted document,
  comparing the search vector received at the at least one search vector saved by measuring a distance between the search vector received and the at least one search vector saved,
  transmitting to the sender of the first request, at least one search vector whose distance with the received search vector is less than a predetermined threshold, called selected vector.

Advantageously, the device comprises means for:
  receiving a second request from the sender of the first. The request, for at least one required multimedia document, comprises at least one selected search vector from among the at least one search vector transmitted.
  transmitting to the sender of the second request, at least one encrypted verification vector corresponding to the at least one selected search vector.

According to a particular embodiment, the device comprises means for:
  receiving a first request from a sending user. The request for a required target multimedia document comprises at least the fingerprint associated with the encrypted document,
  comparing the search vector received at the at least one search vector saved by measuring a distance between the search vector received and the at least one search vector saved,
  of transmitting to the sender of the first request, at least one encrypted verification vector corresponding to the at least one selected search vector.

Advantageously, following the transmission of at least one verification vector, the device comprises means for:
  receiving a request from the sender for at least one required multimedia document. The request comprises at least one verification vector selected from among at least one verification vector transmitted.
  transmitting to the sender of the request, at least one pair corresponding to at least one received verification vector, comprising at least one encrypted item of data and at least one corresponding encrypted hash.

Advantageously, following the transmission of at least one verification vector, the device comprises means for:

receiving a transmitted request following the decryption of the verification vectors by the sender of the first request and the elimination of false positives. The second request comprises an identifier of the selected data following the elimination of the false positives, means for transmitting to the sender of the request, the pairs, comprising the encrypted data and the associated corresponding encrypted hash, The invention also relates to an online storage device able to store multimedia data. This method comprises the steps for:

receiving data comprising a multimedia content in encrypted form according to a convergent encryption, an associated fingerprint.

comparing the encrypted multimedia content with those previously stored.

saving data, if the content is not already stored.

The method also comprises the steps for:

receiving data. The data comprise a recipient user identifier, an encrypted hash value for the user, an associated fingerprint. The fingerprint comprises a non-encrypted search vector, search of the encrypted multimedia content, corresponding to the non-encrypted search vector, transmission of the search result, if the encrypted multimedia content has been found. The data transmitted comprises the encrypted multimedia content, the encrypted hash value, During this method during the transmission step, the data transmitted also comprises the fingerprint associated with the encrypted multimedia content.

Online storage method of multimedia data comprising the steps of:

hashing of multimedia data to save in order to obtain a hash value, encryption of multimedia data to save by the hash value, calculation of a fingerprint associated with the multimedia data to save, saving of the encrypted multimedia data and of the associated fingerprint.

The invention also proposes according to a second aspect, a method for transmitting multimedia data. This method is used by the user wanting to store their data on the SSP. This method comprises the steps for:

encrypting multimedia data using a convergent encryption method, calculating a fingerprint corresponding to the multimedia data, from non-encrypted multimedia data. The fingerprint comprises a non-encrypted search vector, transmitting a set of data comprising at least the encrypted multimedia data and the associated fingerprint.

Advantageously, during the transmission step, the set of data sent comprises at least one user pair and an encrypted hash key associated with the user. The user is the recipient of the data. The encrypted hash key is obtained from the hash value of the non-encrypted multimedia data, encrypted with the public key of the user.

Advantageously, the fingerprint obtained during the calculation step, comprises a search vector and an encrypted verification vector.

Preferentially, the encrypted verification vector is obtained by the encryption of this verification vector with the hash value.

Advantageously, the encrypted verification vector is obtained by the encryption of this verification vector with the public encryption key of the user.

The invention also relates to a device for transmitting multimedia data. This device comprises:

means for encrypting multimedia data using a convergent encryption method, means for calculating a fingerprint of the multimedia data from non-encrypted multimedia data, means for transmitting a set of data comprising at least the encrypted multimedia data and the associated fingerprint.

Advantageously, the set of data sent by this device comprises at least one user pair and an encrypted hash key associated with this user. The encrypted hash is designed to enable the user to decrypt the multimedia data. This encrypted hash key is obtained from the hash value of the non-encrypted multimedia data, encrypted with the public key of the user.

According to a third aspect, the invention proposes a method for receiving multimedia data. This method is intended for a recipient user of the multimedia data and having a public key and a private key. This method comprises the steps for:

receiving a set of data comprising at least multimedia data in encrypted form by a convergent encryption method and an encrypted hash value associated with the multimedia data, intended for the user, decrypting the encrypted hash value with the private key to obtain a non-encrypted hash value, decrypting multimedia data with the hash value to obtain the non-encrypted multimedia data.

Advantageously, all data received at the reception step also comprises a search vector.

Advantageously, the reception method comprises the steps for:

transmitting a search request for similar multimedia data, the request comprising a search vector, receiving fingerprints similar to the fingerprint transmitted. The similar fingerprints are composed of doublets comprising a search vector, an encrypted verification vector intended for the user, decrypting verification vectors with the private key to obtain the non-encrypted verification vectors, Advantageously, the reception method comprises the steps for:

transmitting a request for selected similar multimedia data.

receiving multimedia data in encrypted form and an encrypted hash value associated with the multimedia data. The multimedia data is encrypted by a convergent encryption method. The encrypted hash value is intended for the user, decrypting the encrypted hash value with the private key to obtain a non-encrypted hash value, decrypting multimedia data with the hash value to obtain the non-encrypted multimedia data.

The invention also relates to a device for receiving multimedia data, intended for a user having a public key and an associated private key, comprises means for:

receiving a set of data comprising at least multimedia data in encrypted form by a convergent method and an encrypted hash value associated with the multimedia data, intended for the user, decrypting the encrypted hash value with the private key to obtain a non-encrypted hash value, decrypting multimedia data with the hash value to obtain the non-encrypted multimedia data.

Advantageously, all data also comprises a search vector.

Advantageously, the reception device comprises means for:
- transmitting a search request for similar multimedia data, the request comprising the search vector,
- receiving doublets comprising a search vector, an encrypted verification vector intended for the user,
- decrypting verification vectors with the key to obtain the non-encrypted verification vectors, Advantageously, the reception device comprises means for:
- transmitting a request for selected similar multimedia data.
- receiving multimedia data in encrypted form by a convergent method and an encrypted hash value associated with the multimedia data, intended for the user,
- decrypting the encrypted hash value with the private key to obtain a non-encrypted hash value,
- decrypting multimedia data with the hash value to obtain the non-encrypted multimedia data.

3. LIST OF FIGURES

The invention will be better understood and illustrated by means of non-restrictive embodiments and advantageous implementations, with reference to the accompanying drawings, wherein:

FIG. 1 shows a storage device according to a preferred embodiment of the invention, FIG. 2 shows a system implementing a preferred embodiment in relation to the consultation of multimedia data, FIG. 3 shows a system implementing a second embodiment in relation to the consultation of multimedia data, FIG. 4 shows a flowchart for a preferred embodiment of an aspect of the invention in relation to the encryption of data.

FIG. 8 shows an operation flowchart of the encryption of the hash key intended for a recipient user.

FIG. 9 shows an operation flowchart for a preferred embodiment of the invention related to the decryption.

FIG. 10 shows an operation flowchart of the search for similar multimedia content according to a preferred embodiment.

4. DETAILED DESCRIPTION OF THE INVENTION

The invention shall be described with reference to a particular embodiment intended for storing photos or images. Obtaining a fingerprint is specific to the type of the document. In this respect, the fingerprint calculation techniques cited apply to the images and photos.

In the rest of the description the terms, multimedia data, documents and content will be used interchangeably to designate the same thing. These terms will designate on the one hand images or photos, but also all the multimedia content for which this problem arises notably such as text, audio and video documents.

Likewise, the terms encryption and data coding are used interchangeably to designate the encryption of data in the aim of protecting it from being consulted by anyone. It must be noted that for the entire description, the data or multimedia content is systematically stored encrypted by the SSP.

The term hashing and cryptographic hashing are used as synonyms.

Finally, the term of reference (multimedia) document is used in the context of similar content searches. It designates the multimedia content whose fingerprint is used to make comparisons with the fingerprints of the multimedia content stored by the SSP, in order to identify the similar content available from the SSP.

Figure 1:
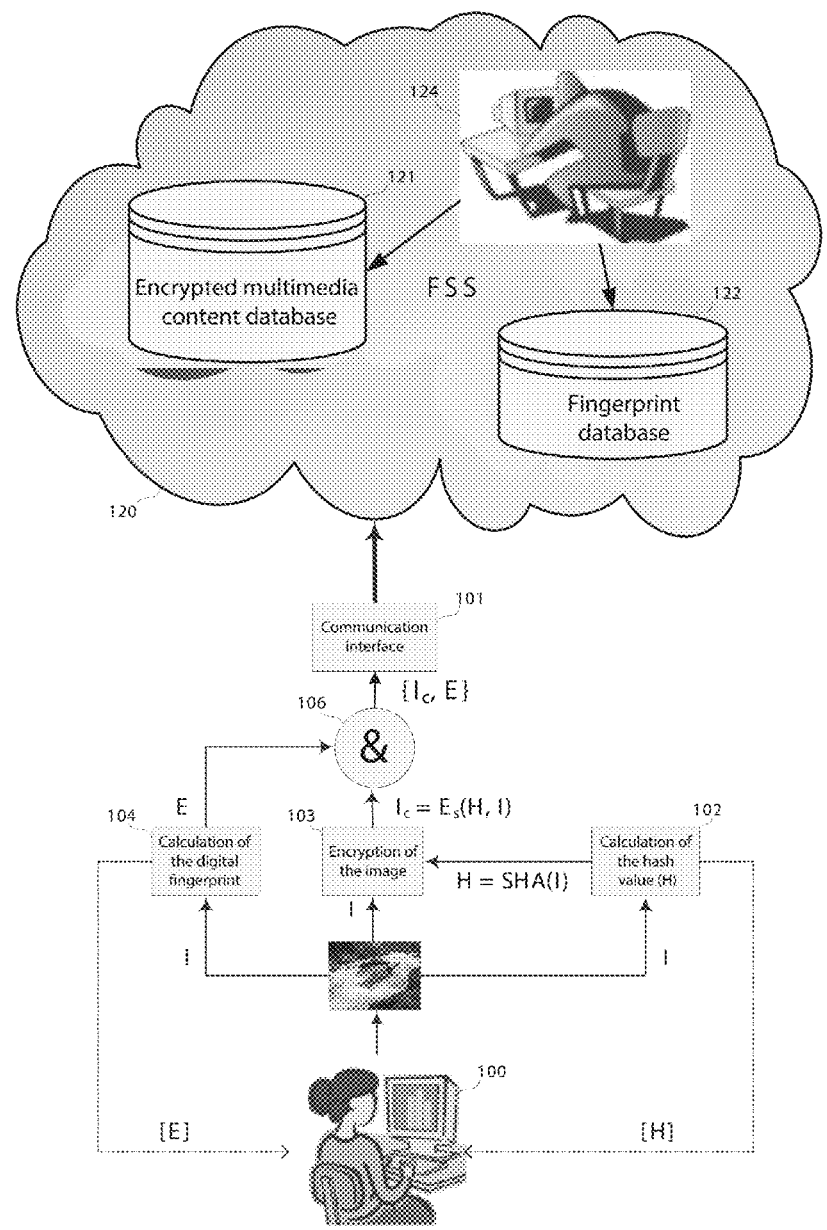
Figure 2:
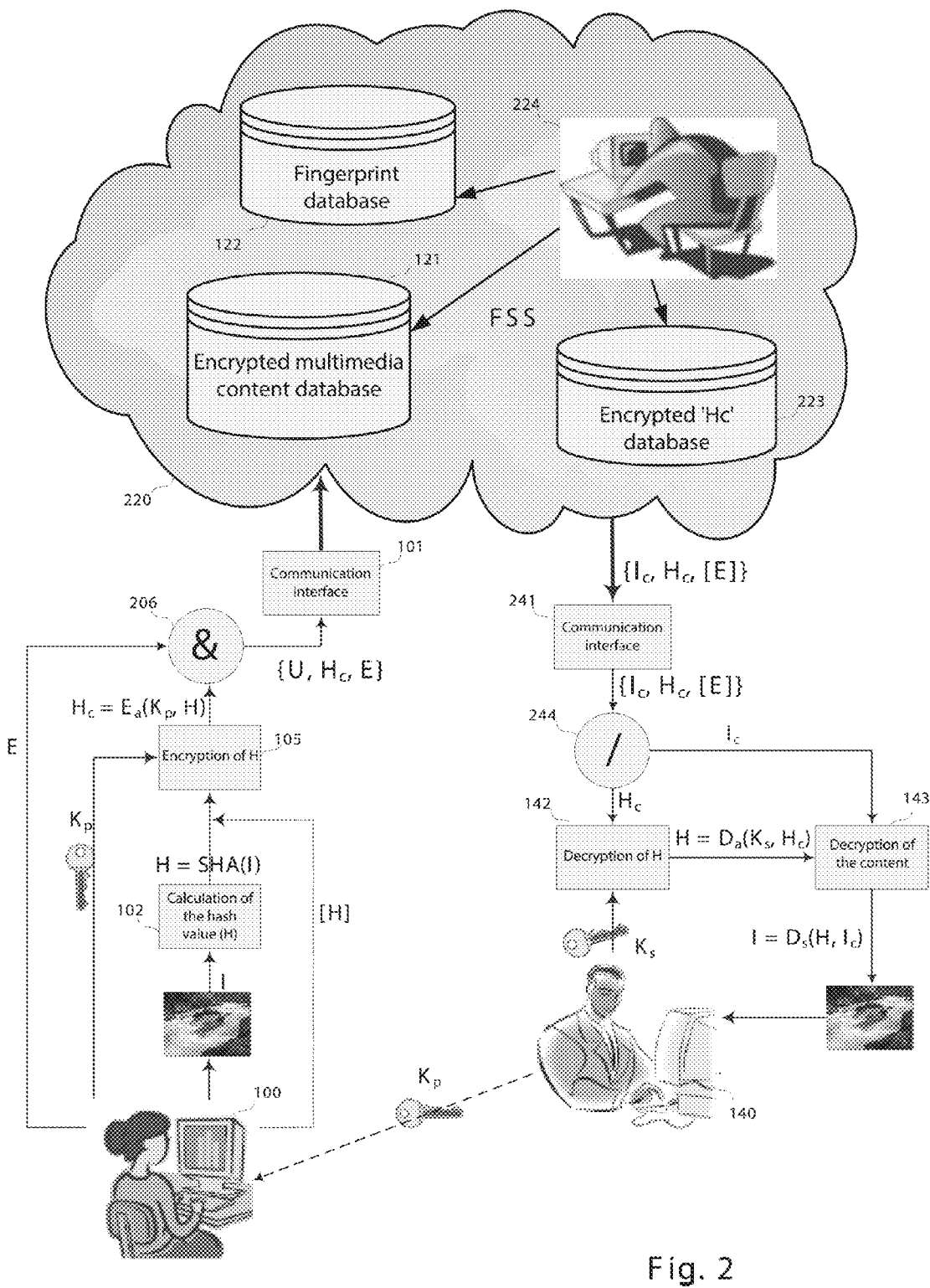
Figure 3:
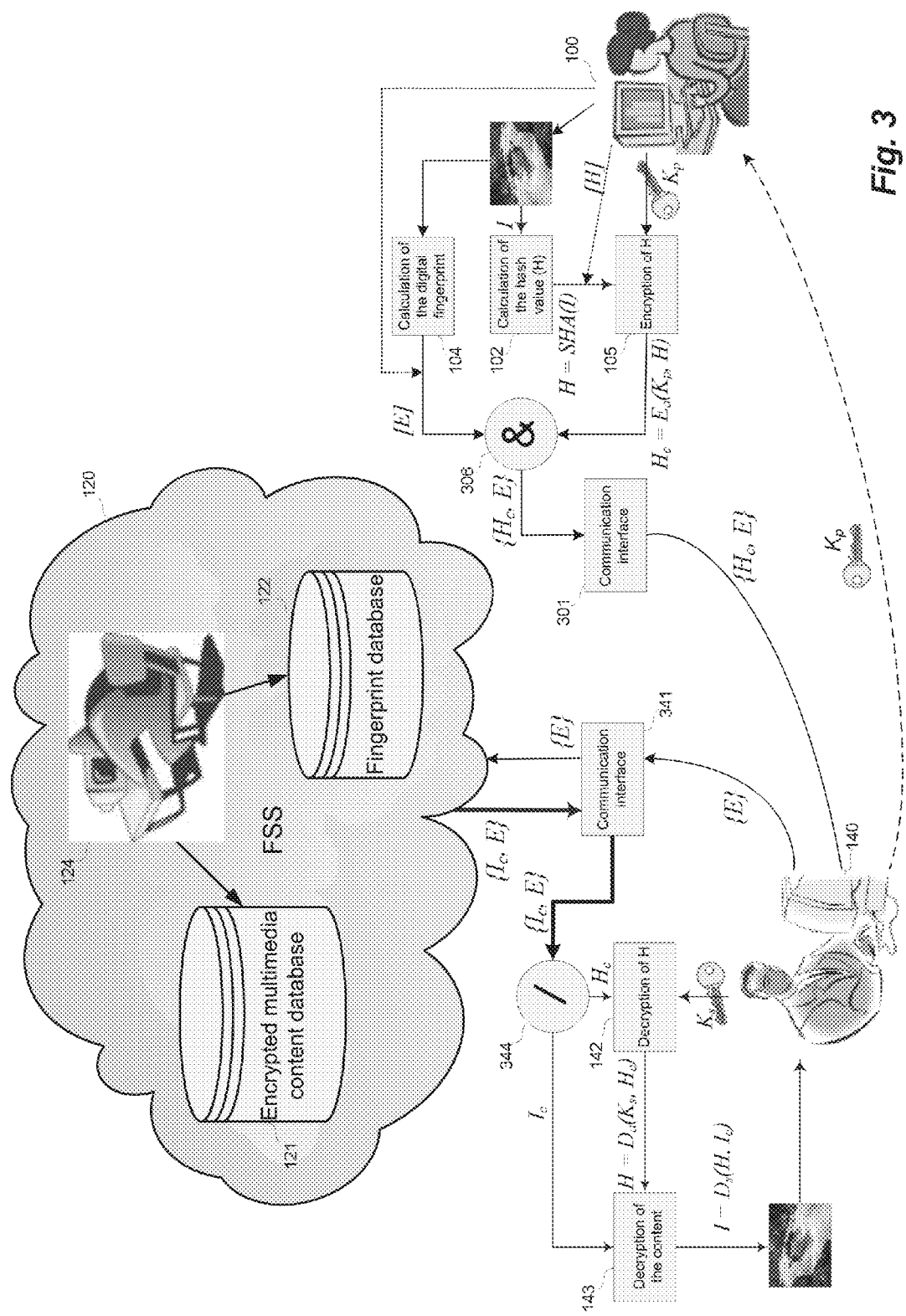

By convention, in FIGS. 1 to 3, the data shown between brackets is optional. It can be transmitted, stored, used according to the embodiment variants.

FIG. 1 shows a system implementing a preferred embodiment of the invention.

A first user wants to transmit data I to a recipient correspondent. An online storage provider SSP (120) proposes pooling services, archiving of multimedia content between several users.

The users can use the service to archive their collections of multimedia content but they can also use it to share either all or part of their collections with other authorised users.

In order to meet the need to preserve the private life of the users and the capacity of the SSP to detect strictly identical copies of the multimedia documents in the collections of the users, the online storage system has the following characteristics:

- The SSP has access only to the encrypted multimedia data I, of the users and the SSP must not be able to decrypt it. The SSP thus receives and stores, only encrypted data.
- The SSP can detect that two encrypted multimedia contents correspond to two strictly identical multimedia documents.
- Only the authorised users can decrypt all or part of the encrypted multimedia contents that are archived in the account of a user.

The device (100) of the first user comprises encryption means (103) that encrypt the multimedia content to save. The encryption $E_s$ used by the encryption means (103) is a convergent encryption, it is described in FIG. 4. The device (100) comprises means (102) for calculating a hash value H. The convergent encryption $E_s$ enables the SSP to apply the file deduplication methods even if the files are encrypted with different keys. The encryption can also be implemented on a device other than a computer and by hardware means rather than by a computer program.

The invention also relates to the possibility of requesting a search for multimedia content similar to the consulted multimedia content. Within this framework, to define the consulted multimedia content, the term reference multimedia content will be used in the rest of the description.

In order to meet the search requirement of similar multimedia content, the encrypted multimedia content I, transmitted is accompanied by a digital fingerprint E.

The fingerprint E enables an effective search, it can eliminate false positives and preserves the confidentiality of the reference content.

Figure 6:
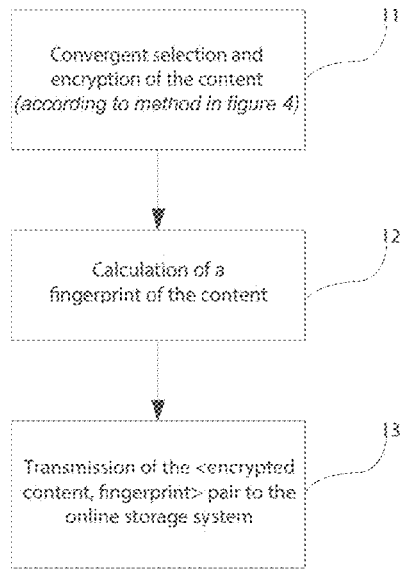
FIG. 6 shows an operation flowchart of the invention according to a first embodiment related to the storage.
Figure 7:
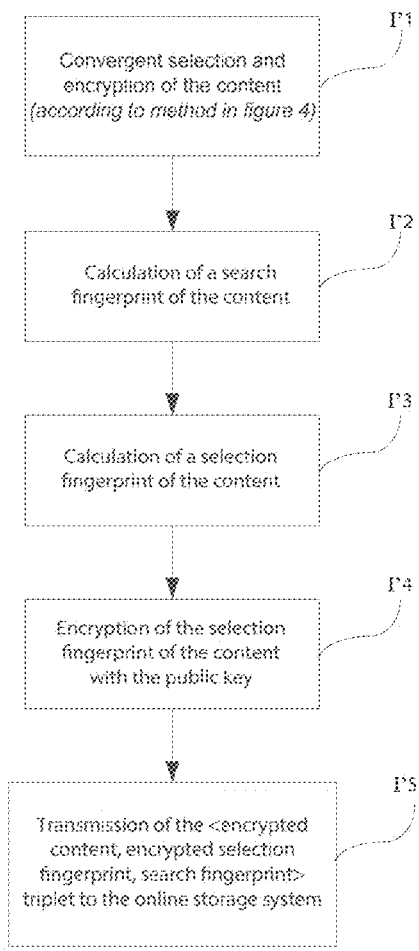
FIG. 7 shows an operation flowchart of the invention according to a second embodiment related to the storage.

The device (100) of the first user comprises calculation means (104) to calculate the fingerprint E from the non-encrypted multimedia content I, as described in FIG. 6 and FIG. 7. During the calculation, the fingerprint E just like the non-encrypted hash value H can be stored locally for subsequent use.

FIG. 2 shows an aspect of the invention relating to the consultation of data.

A first user authorises the access to data I, already stored with an SSP (120) for a recipient user U. Said SSP proposes functionalities associated with its storage services as shown during the description of FIG. 1.

To be able to transmit its multimedia data, the first user requires the recipient user to provide him with the public encryption key $K_p$, by any communication means known to those skilled in the art, for example, an e-mail. Using this one, the encryption means (105) encrypts for the recipient user, the hash value of said data and transmits to him by the means of the communication interface (101) via the SSP (220) the encrypted hash value $H_c$, as described in FIG. 8. Means (102) recalculate the non-encrypted hash value H from multimedia data still stored by the device (100) of the first user. According to a variant, the hash value H was stored non-encrypted on the device (100), during the step described in FIG. 1 and is used again. To enable the SSP to set up the relationship between said encrypted hash value $H_c$, the corresponding multimedia data and the recipient user, the device of the first user also transmits an identifier of the user U and a fingerprint E of the multimedia data. Just like the non-encrypted hash value, the fingerprint is recalculated as described in FIG. 1. According to a variant, the fingerprint E was stored as described in FIG. 1 by the calculation means (104) and it is used again by the device as described in FIG. 2.

The means (206) prepares data comprising a triplet <E, U, Hc> corresponding to an identifier U of the recipient user, the hash value $H_c$ of the multimedia content and the fingerprint E of the multimedia content. The identification methods of a user are many and known to those skilled in the art. This identifier can for example be an e-mail address of the recipient user of the multimedia content. Finally, the data is transmitted to the SSP (220) by the communication interface (101).

As will be seen in FIG. 8, the SSP stores in a database (123) the pair <U, $H_c$>, identifier of the user, hash value and it sets up a link between this pair and the corresponding encrypted multimedia data present in the database of the encrypted multimedia contents (121). To set up this link, the SSP (220) uses the fingerprint database (122) and the fingerprint E received in said triplet.

The communication interface (241) implemented by the device (140) of the recipient user received data that comprises the encrypted content $I_c$, the associated encrypted hash value $H_c$. The data supplied to a decryption means (142), by an extraction means (244). Using the private key of the recipient user $K_s$, the decryption means (142) decrypts the hash value $H_c$ to obtain H. Means (143) for decrypting the content uses the hash value H to decrypt the multimedia content according to the description of the FIG. 9. The data received by the device from the recipient user can also include a fingerprint E on the multimedia data to enable a search for similar content. The transmission by the SSP (220) of the fingerprint E is optional. It is not necessary for decrypting the multimedia content. The optional side of the transmission is symbolised by a representation between brackets in the figure, between the SSP (220), the communication interface (241) and the extraction means (244).

FIG. 3 shows a variant of the second aspect of the invention relating to the consultation of data described in FIG. 2.

As in the scenario previously cited, the first user wants to transmit multimedia data I to the recipient user. Overall, the scenario is similar. However, it is distinguished by the transmission method applied by the communication interface (301) of the encrypted hash value $H_c$ and the fingerprint E. And on the other hand by an additional action carried out by the communication interface (341) implemented by said program contained on the computer of the recipient user, in the form of a request sent to the SSP (120), to obtain the multimedia content.

Indeed, the communication interface (301) of the first user, after receiving the pair <$H_c$, E> constituted by the means (306), transmits the pair directly to the device (140) of the recipient user U. The encrypted hash value $H_c$ is obtained according to the method (105) described in FIG. 2. The fingerprint E, just like the one of FIG. 2 comprises a search fingerprint V (or search vector). It can also comprise a verification fingerprint $S_c$ (or verification vector), to enable the recipient user U to request a search for similar content.

After receiving the pair <$H_c$, E>, the reception device (140), using the means of the communication interface (341) sends a request to the SSP to obtain the encrypted multimedia content $I_c$. The request of the recipient user comprises the search fingerprint E. Preferentially, this request includes the encrypted hash value $H_c$ associated with the identifier U of the recipient user, to enable storage by the SSP.

Upon receipt of said request, the SSP (120) uses the search fingerprint to identify the encrypted multimedia content $I_c$ to supply. Advantageously, the SSP can also transmit the associated fingerprint E contained in the fingerprint database (122), comprising a verification vector, to enable a subsequent search for similar content.

In the case where the SSP also receives the pair <U, $H_c$> encrypted hash value, identifier or the user U, the SSP stores the pair in the database of the hash values. It also creates the link between said pair and the encrypted multimedia content $I_c$, as described in FIG. 8.

The communication interface (341) of the recipient user, then receives the expected multimedia content and proceeds according to the method already described in FIG. 2 to decrypt and use the content.

Figure 4:
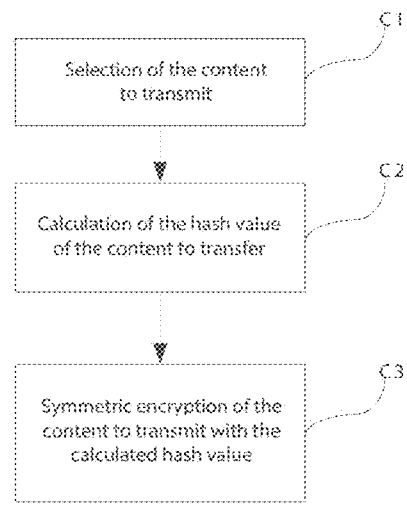

FIG. 4 shows a convergent encryption flow chart still called convergent encryption implemented by the encryption means (102,103) in the device (100).

The convergent encryption described above is well known to those skilled in the art and rests on a symmetrical encryption method.

In reference to FIG. 4, during a step C1, the first user selects the content I to transmit to the SSP. During a step C2, cryptographic hash value H is calculated by the computer of the first user, this cryptographic hash value H can be of the type SHA-256. It is possible to choose another hash length for example SHA-512, but also any other hashing method like MD5. This cryptographic hash value H is then used as encryption key, to encrypt with a symmetric algorithm $E_s$, the content I that the first user wants to transmit during a step C3, and obtain the encrypted content $I_c$. It is the encrypted content obtained that will be transmitted to the SSP (120, 220) in FIG. 6 and FIG. 7.

Hence, the proposed system can advantageously maintain the confidentiality of the data saved by the SSP while enabling it not to duplicate the saved data unnecessarily.

Since the content of the file is encrypted with its own cryptographic hash value as key, the encrypted content is independent of the keys of the recipient user, used. It is only dependent on the uncoded content. Consequently, the supplier of the storage service (SSP), without knowledge of the private keys of the users, can detect that two files are strictly identical and store them in the space corresponding to a single file. Hence, the SSP minimises the storage place required to store all the data to store.

Figure 5:
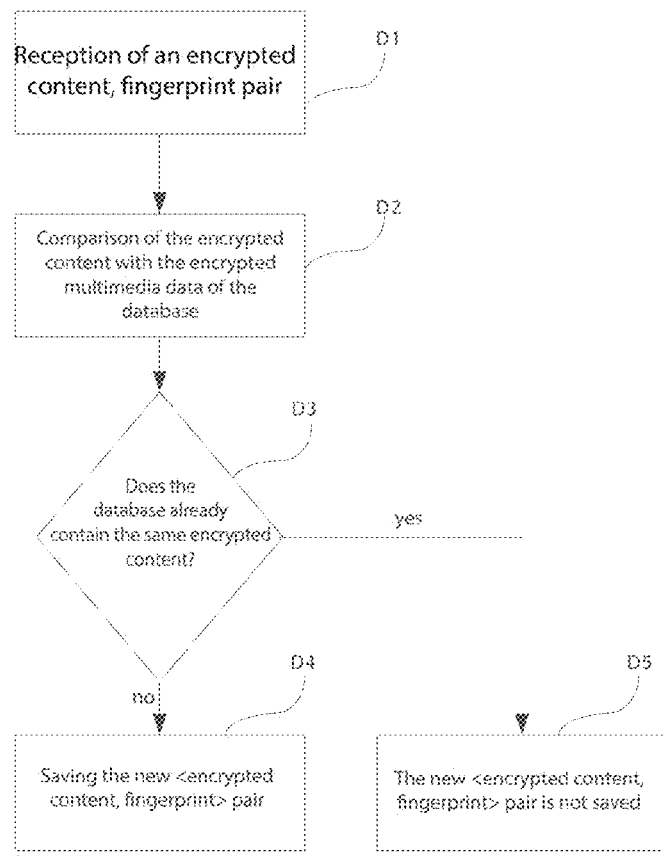
FIG. 5 shows an operation flowchart for a preferred embodiment of the deduplication.

The operation of the deduplication is illustrated in the flow chart detailed in FIG. 5.

When the SSP receives a content to save, step D1, it receives according to the invention, an encrypted content I, and an associated fingerprint E.

Given that the encrypted content $I_c$ is encrypted with its own hash value H, two identical contents encrypted with their own hash values are also identical after encryption. Hence, the SSP can easily compare two encrypted contents, step D2. During a step D3, the SSP compares the encrypted content $I_c$ received with the contents of the SSP. If this comparison is fruitful, the content $I_c$ being already stored, it is not saved again. However, if this comparison proves unfruitful, the new encrypted content is saved with the associated fingerprint.

FIG. 6 represents an embodiment implementing the search for similar content in the SSP.

As it has been seen above, the search for duplicates has the purpose of optimising the storage at the SSP and if it uses cryptographic hashing techniques, and for illustrative purposes a hashing of the type SHA-256. The result of the hashing function radically changes if a single input bit changes. Take the example of a same image backed up with two different compression formats (e.g. BMP and JPEG), the hash values of these two files are completely different whereas the images are visually similar. This problem exists with all the multimedia contents, of which the audio (e.g. Mp3, Flac), or video documents (MPEG, Ogg, QuickTime). Consequently, the cryptographic hashing techniques are useful for identifying strictly identical copies (bit for bit) of an image but they are not useful for searching for images visually similar to a reference image.

According to this aspect of the invention relative to the search for similar content, and at the request of an authorised user, the SSP can carry out search requests for similar multimedia content, by the nearest neighbour method, in the collections of multimedia data of the users without having access to the uncoded multimedia documents. The result of such requests is equivalent to the result that the user would have obtained if he has made such requests on a collection of non-encrypted multimedia documents.

To resolve the problems of searching for similar content, use is made of fingerprint functions, or dedicated multimedia DNA of the type of multimedia content concerned. This is for example the case for image fingerprints, also called image descriptors. These descriptors have the particularity of being tolerant to the distortions of the images. There are two major classes of descriptors:

The global approach, such as the histogram of grey levels, describes the content of the image in its entirety. This algorithm is rapid but its image descriptor does not withstand the distortions of the image.

The local approach, such as points of interest, describes the content of the image as a collection of fingerprints of parts of images belonging to the same image. This algorithm is complex and slow but its image descriptor withstands many distortions.

The similarity between two images A and B is simply determined by an exhaustive search of the closest neighbour of each descriptor of the image A in the set of descriptors of the image B.

The transition to scale, that is the search for similarity between an image A and the set of images of an image library is much more complex. This transition to scale requires the set up of an efficient systems for resolving the problem, called the closest neighbour, defined as follows: That is a collection of points of data and a point of request in a metric space of dimension <n>, find the point of data that is the closest to the point of request. The usual manner of applying such a system is as follows.

A set of descriptors, called collection of points of data, is calculated on a given library of photos. Next, when a similarity request is launched, the fingerprint of the image of request is calculated in order to obtain the point of request, and next the point of data closest to the point of request is determined.

The effectiveness of a closest neighbour search is evaluated according to measures called accuracy and recall of the request. These measures essentially depend on the algorithm of the image fingerprint and the search algorithm of the closest neighbour.

The existing image fingerprint algorithms are diverse and varied and, for illustrative purposes, two will be cited: BoF (Bag of Features); and VLAD (Vector of Locally Aggregated Descriptors), based on a representative of the image based on a vector of locally aggregated SIFT descriptors. As algorithms for indexing/search for descriptors, we can thus cite two of them: LSH (Locality-Sensitive Hashing) and Hamming Embedding.

In the rest of the description, the image fingerprint will be defined as a vector of fixed size Zn belonging to a metric space. As a reminder, the norm of a vector Zn provides a measure of distance, such that Zn with a norm of Zn define a metric space. One of the most popular norms of vector is the Euclidean distance (norm L2) but other norms of vector exist and can be used.

It is important to mention the influence of the dimension <n> of the image fingerprint on the effectiveness of indexing digital image libraries at large scale, and on the accuracy and recall of the request from the database. The large dimension image fingerprints usually provide a better accuracy and a better recall than small dimension image fingerprints, but it is more difficult to effectively index large dimension image fingerprints. The discrimination capacity of a small dimension image fingerprint is less than that of a large dimension image fingerprint and may not be satisfactory.

With reference to FIG. 1, according to this embodiment, the computer of the first user calculates and transmits besides the encrypted content $I_c$, a fingerprint E relating to the content, thus constituting an information pair <$I_c$, E>.

The flow chart of FIG. 6 illustrates this procedure. Step I1 is described in FIG. 4 and is not detailed here.

In step I2, the computer of the first user calculates a fingerprint of the content to transmit, according to one of the known methods previously given. This fingerprint is a search fingerprint.

During a step I3, the pair, encrypted content $I_c$ and fingerprint E, is transmitted to the SSP for archiving if there is no duplication.

In a preferred embodiment, the pair <$I_c$; E> sent by the device of the first user to the SSP (220) is sorted and stored in two different databases, that is, one database for each of the components of the pair. It is important to stress that the memory space required to store the fingerprint <E> is negligible in relation to the space required to store the encrypted image $I_c$. According to a variant, the SSP uses a single database to store the pair <$I_c$; E>.

The reception procedure by the recipient user of the content I transmitted by the first user is the same as the one described with reference to FIG. 9, the recipient user further receiving the fingerprint with the encrypted hashing $H_c$ and the encrypted content $I_c$.

A very important characteristic of a photo library is the possibility, for the authorised users, to consult the image database according to its content. For example, the users, who can be the first user or the recipient user, must be able to search the photo library for almost identical images or images similar to an image presented to the system as an example.

As explained above, the usual manner to meet such a requirement is to associate a fingerprint E (a vector Zn belonging to a metric space) with each of the images of the photo library. To determine if two images are almost identical or similar, the user calculates the Euclidean distance (norm L2) between the fingerprints corresponding to the two images and he compares this result with a given threshold. Since the SSP has access to the uncoded fingerprints of the images, the SSP can, at the request of the users, run queries on the database of the images. It must be mentioned that we assume that SSP cannot obtain any information, concerning the uncoded image, through its knowledge of the uncoded fingerprint of the image. This implies that the fingerprint of the image cannot be used to reconstruct the image from the knowledge of the fingerprint of the image. Hence, small dimension fingerprints are favoured to limit the leak of information to the SSP.

Hence, when the recipient user transmits a triplet to the SSP for a search for similar images, the SSP can carry out a similarity measure on the images that it stores, by using one of the methods previously described and supply the recipient user with one to several similar images, associated with its cryptographic hashing and its fingerprint.

Given that the measurement of similarity is carried out by comparing small dimension fingerprints, the accuracy obtained can be insufficient and the recipient user can receive one or more false positives. Hence, the embodiment proposes hereafter to improve the robustness by reducing the number of false positives while guaranteeing a confidentiality of the data stored on the SSP.

FIG. 7 illustrates this embodiment. Step 11 is described in FIG. 4 and is not detailed here again.

During step I'2, a search fingerprint is calculated, for example according to the method of the VLADs to produce a fingerprint V.

As a continuation from step I'2, there is a transition to step I'3 in which a selection fingerprint S is calculated. S is a selection vector, called bag of descriptors. During a step I'4, S is encrypted. Preferentially, the encryption will be advantageously obtained with the cryptographic hash value H. In an alternative implementation, the encryption will be obtained by using the public key that the recipient user has transmitted to the first user, also used to encrypt the cryptographic hash value H.

During a step I'5, the triplet comprising the encrypted content $I_c$, the search fingerprint V and the encrypted selection fingerprint $S_c$ is transmitted, that is $<I_c, V, S_c>$.

FIG. 8 illustrates the creation of an encrypted hash value for the recipient user. This process assumes that the recipient user has previously provided his public encryption key $K_p$ to the first user that the latter has already transmitted the multimedia data to the SSP according to the principle of FIG. 1.

During a step H1 the encrypted hash value is provided to the device, either by selection of a key stored on the computer of the first user, or by a new calculation (102) from the multimedia data chosen.

During the following step H2, the cryptographic hash value H is encrypted using an asymmetric hashing $E_a$, with said public key $K_p$.

Finally, during a step H3, a triplet $<E, U, Hc>$, comprising, the fingerprint E of the multimedia content, the identifier of the recipient user U and the associated encrypted cryptographic hashing $H_c$ is transmitted to the SSP (120, 220). The SSP then transmits them to the recipient user. The user pair U, encrypted hash $H_c$, is saved and a link is created by the SSP between the saved content and the plurality of saved associated hashes, as each hash is encrypted with a different public key and it is therefore necessary to save them for each user. The user pair, encrypted hash being of small size, this does not pose any problem of storage space on the SSP and remains negligible in relation to the size of the multimedia content stored.

In an alternative implementation, the device (100) used by the first user performs all the steps described in FIG. 6 or in FIG. 7 and the ones of FIG. 8 to perform a grouped send operation of all the data. This is the case for example when the multimedia data has not been transmitted beforehand to the SSP.

The recipient user of the multimedia content then recovers the multimedia data to use it.

For this, with reference to FIG. 9, the recipient user requests the SSP for the content that the first user has saved on the SSP (120,220) for him, in step V1.

The device of the recipient user receives the encrypted content $I_c$ and the associated cryptographic hash value H. Using the private key $K_s$ of the recipient user, the device decrypts the cryptographic hashing $H_c$ during a step V2. Next, during a step V3, the encrypted content $I_c$ is decrypted suing the decrypted cryptographic hashing H, used as decryption key. The recipient user can then read the content I.

During the reception of the multimedia data, said data can also include an associated fingerprint E. The received fingerprint enables the recipient user to search for similar content.

FIG. 10 illustrates the search by the recipient user for all the data similar to a reference content in the SSP.

During a step R1, the recipient user transmits to the SSP a search request for similar data containing his identifier U and the fingerprint V of the reference data for which he wants to recover similar data.

During a step R2, the SSP searches for similar data by using the search fingerprints V stored with the one transmitted by the user.

In a preferred embodiment, during a step R3, the SSP transmits to the recipient user the set of triplets $<H_c, V, S_c>$ corresponding to the set of the close neighbour fingerprints of V that it finds. Owing to the low accuracy of the search carried out by the SSP, the recipient user receives a certain number of fingerprints of multimedia data that are false positives.

During a step R4 the computer of the recipient user decrypts, with the private key of the recipient user, the cryptographic hash values ($H_c$), to obtain the non-encrypted hash value (H). Said obtained hash values (H) are then used to decrypt the selection image fingerprints $S_c$ of the received images to obtain the uncoded image fingerprints S that it uses, during a step R5, to eliminate the false positives of the set of triplets $<H_c, S_c, V>$ that it received from the SSP. This is made possible as the recipient user has his private key and the fingerprints S are of a sufficiently large dimension to detect the false positives.

During a step R6, the recipient user sends a second request to the SSP to request the doublets $<I_c, H_c>$ of the selected multimedia data. The fingerprints associated with each of said doublets can also be supplied by the SSP.

In an alternative embodiment, during a step R3, the SSP transmits to the recipient user the set of doublets <$S_c$, V> corresponding to the set of the close neighbour fingerprints of V that it finds, with the same problem of accuracy mentioned previously.

In this alternative mode, during a step R4 the computer of the recipient user decrypts, with the private key $K_s$ of the recipient user, the selection image fingerprints $S_c$ of the received images to obtain the uncoded image fingerprints S that it uses, during a step R5, to eliminate the false positives of the set of doublets <$S_c$, V> that it received from the SSP. This is made possible as the recipient user has his private key and the fingerprints S are of a sufficiently large dimension to detect the false positives.

The step R6 of the alternative mode is identical to the preferred embodiment.

An additional advantage of the invention and the protection of copyright can be noted. Indeed, if the SSP comprises an uncoded reference photo, it can determine whether the users have identical copies to this reference photo. For example, if the SSP has a photo of the Eiffel tower, taken by a renowned photographer, it can determine whether one or more of its customers has an identical copy of this photo, stored in their photo collections.

If the SSP does not have any uncoded copy of the photos stored in its servers, it is impossible for it to use the encrypted image database stored with it. On the other hand, if the SSP legally has an uncoded copy of a photo for which it knows the owner, it can determine whether the users of its online storage service have an illegal copy of this photo stored in its servers.

Although the description chiefly covers an image type content, the invention is not limited to the embodiments described previously. As it has been said, this SSP online storage system is also applicable for other types of documents and notably videos.

As a reminder, the invention uses two known technologies, convergent encryption, enabling the application of deduplication, and the document fingerprint to be able to search for similar documents.

With regard to deduplication, the encryption technique applied remains independent of the type of multimedia document to process, it guarantees the possibility of applying the deduplication during the storage of the multimedia documents. It is on obtaining the fingerprint, in order to enable the search for similar documents that the differences appear. Those skilled in the art know that the methods for calculating fingerprints are specific to the type of content. However, the comparison to identify similar multimedia content remains based on the closest neighbour technique, already described in FIG. 6.

For example, the invention, according to a first variant, can be applied to audio documents. Indeed, for problems of searching databases, falsification/authentication, watermark of audio documents, many fingerprint creation methods have been developed. There are many algorithms for calculating audio document fingerprints. This is described particularly in the publication "Robust audio hashing for audio identification" by Hamza Özer, Bülent Sankur and Nasir Memon, published in 2001 (Proc. Content-Based Multimedia Indexing).

Likewise, according to a second variant, it is possible to process video documents. Just as for the other types of documents, there are fingerprint calculation methods. For example, a fingerprint calculation description is given in publications number 2297-23000, "A video fingerprint based on visual digest and local fingerprints" par Massoudi, A., Lefebvre, F., Demarty, C.-H., Oisel, L. and Chupeau, B (Proc. IEEE Int. Conf. on Image Processing 2006) and number 3411-3414 "Global motion estimation for MPEG-encoded streams", by Coudray R. and Besserer B., (Proc. IEEE Int. Conf. on Image Processing 2004)

According to another variant, it is also possible to process text documents. The text fingerprint methods have been developed particularly for the detection of plagiarism in electronic documents. Publication number 342-353 "New Algorithms for Text Fingerprinting" by Roman Kolpakov, Mathieu Raffinot (in Combinatorial Pattern Matching, 2006) describes methods for obtaining text fingerprints.

According to a variant, the encrypted multimedia data Ic and associated fingerprints E are stored in two different SSP (FSS1 and FSS2), one storing encrypted multimedia data (FSS1), the other the fingerprints (FSS2). This has the advantage of reassuring the first user with regard to the level of confidentiality of his data. Indeed, the depositing party of the multimedia data not having any fingerprints and in particular the search vector that is not encrypted, it cannot, using this search vector, attempt to reconstitute the multimedia data of the first user, in the case for example where the search vector is of large dimension. It cannot either search for similar multimedia data. For this to function, the encrypted hash values associated with the multimedia documents must also be stored on at least one of the SSPs, always with the identifier of the user for whom the value has been encrypted.

However, the method requires a coordination between the SSP (here SSP1 and SSP2) to maintain the relationship that exists between the triplet, multimedia data, encrypted hash values for a user and fingerprint, but it guarantees the possibility of applying the deduplication. To carry out a search for similar multimedia data, the reception device of the recipient user sends a request to the one of the SSP storing the fingerprints E (here SSP2). Upon reception of the response, the reception device of the recipient user requests the second SSP for the multimedia data selected (here SSP1). It is possible to go through a search step (using the search value), followed by a step for eliminating false positives using selection vectors to filter the multimedia data to request from the depositing party of the latter.

This principle of distribution between two SSPs can extend to a cloud comprising a multitude of SSPs distributed in many countries around the planet.

The invention claimed is:

1. A storage device for storing multimedia data comprising:
   a storage configured to store said multimedia data in encrypted form as encrypted multimedia data;
   said storage being further configured to store, for each of said encrypted multimedia data, an associated encrypted selection fingerprint and an associated non-encrypted search fingerprint;
   said encrypted multimedia data and said encrypted selection fingerprint being encrypted using a hash value obtained by hashing of said multimedia data, said encrypted selection fingerprint and said non-encrypted search fingerprint being vectors, and said encrypted selection fingerprint being a vector of larger dimension than said non-encrypted search fingerprint.

2. The storage device according to claim 1, wherein said storage is further configured to store at least one user identifier and an encrypted hash value for each user, each encrypted hash value being encrypted using a public encryption key of said user.

3. The storage device according to claim 2 wherein the processor is further configured to:
- receive a first request from a sender, comprising for a target multimedia data searched, a non-encrypted search fingerprint;
- compare said received non-encrypted search fingerprint to at least a stored non-encrypted search fingerprint by measuring a distance between said received non-encrypted search fingerprint and said at least a stored non-encrypted search fingerprint; and
- transmit to said sender of the first request, at least an encrypted selection fingerprint corresponding to said at least a stored non-encrypted search fingerprint of which said distance is less than a predetermined threshold.

4. The storage device according to claim 1, wherein the storage device is further configured to store at least a user identifier and an encrypted hash value for each user, said encrypted hash value and said encrypted selection fingerprint each being encrypted using a public encryption key of said user.

5. The storage device according to claim 2 wherein the processor is further configured to:
- receive a first request from a sender, comprising for a target multimedia data searched, a non-encrypted search fingerprint,
- compare said received non-encrypted search fingerprint to said at least one stored non-encrypted search fingerprint by measuring a distance between said received non-encrypted search fingerprint and said at least one stored non-encrypted search fingerprint; and
- transmit to the sender of said first request, at least a stored non-encrypted search fingerprint of which said distance is less than a predetermined threshold.

6. The storage device according to claim 5 wherein the processor is further configured to:
- receive a second request from said sender, for at least a searched multimedia document, comprising a non-encrypted search fingerprint selected among said transmitted at least a stored non-encrypted search fingerprint of which said distance is less than said predetermined threshold; and
- transmitting to said sender of the second request, at least an encrypted multimedia data corresponding to said selected non-encrypted search fingerprint.

7. A method for storing multimedia data, implemented by a storage device, the method comprising:
- receiving said multimedia data in encrypted form as encrypted multimedia data;
- receiving, for each of said encrypted multimedia data, an associated encrypted selection fingerprint and an associated non-encrypted search fingerprint;

said encrypted multimedia data and said encrypted selection fingerprint being encrypted using a hash value obtained by hashing said multimedia data, said selection fingerprint and said search fingerprint being vectors, said selection fingerprint being a vector of a larger dimension than said search fingerprint.

8. The method according to claim 7, further comprising storing at least one user identifier and an encrypted hash value for each user, each encrypted hash value being encrypted using a public encryption key of said user.

9. The method according to claim 8 further comprising:
- receiving a first request from a sender, comprising for a target multimedia data searched, a non-encrypted search fingerprint;
- comparing said received non-encrypted search fingerprint to at least one stored non-encrypted search fingerprint by measuring a distance between said received non-encrypted search fingerprint and said at least one stored non-encrypted search fingerprint; and
- transmitting to the sender of said first request, at least a stored non-encrypted search fingerprint of which said distance is less than a threshold.

10. The method according to claim 9 further comprising receiving a second request from said sender, for at least a searched multimedia data, comprising a non-encrypted search fingerprint selected among said transmitted at least a non-encrypted search fingerprint of which said distance is less than said threshold; and
- transmitting to said sender of the second request, at least an encrypted multimedia data corresponding to said selected non-encrypted search fingerprint.

11. The method according to claim 8 further comprising
- receiving a first request from a sender, comprising for a target multimedia data searched, a non-encrypted search fingerprint;
- comparing said received non-encrypted search fingerprint to at least a stored non-encrypted search fingerprint by measuring a distance between said received non-encrypted search fingerprint and said at least a stored non-encrypted search fingerprint, and
- transmitting to said sender of the first request, at least an encrypted selection fingerprint corresponding to said at least a stored non-encrypted search fingerprint of which said distance is less than a threshold.

12. The method according to claim 7, further comprising storing at least a user identifier and an encrypted hash value for each user, said encrypted hash value and said encrypted selection fingerprint each being encrypted using a public encryption key of said user.

* * * * *